Patented Sept. 14, 1943

2,329,644

UNITED STATES PATENT OFFICE 2,329,644

CATALYTIC COMPOSITION

Grafton R. Owens, Dayton, Ohio, assignor to Monsanto Chemical Company, St. Louis, Mo., a corporation of Delaware No Drawing. Application July 13, 1939,
Serial No. 284,201

6 Claims. (Cl. 260—498)

The present invention relates to a new composition of matter which is particularly adapted as an aid in effecting catalytic reactions. More particularly, the present invention relates to a new mercury catalyst containing boric acid as an activating or promoting substance.

Illustrative of one of the uses of the new catalytic composition is the employment thereof in ester formation involving reacting acetylene and relatively active organic acids, such for example as formic acid, chloracetic acid and their equivalents.

In the past it has been proposed to prepare vinyl esters by reacting acetylene and certain organic acids in the presence of a mercury compound having a catalytic action. In such processes, however, the reaction between acetylene and the carboxylic acid takes place very slowly. Moreover, the catalyst soon loses its efficiency.

There have been in consequence many attempts made to improve this method of preparing vinyl esters by adding to the reaction mixture another substance or substances tending to promote the reaction and increase the lifetime of the mercury catalyst. Thus, so-called strong acids as sulfuric and ortho phosphoric acids have been so employed. The use of both these catalysts tends to form by-products and discoloration of the ester. Furthermore, sulfuric acid and ortho phosphoric acid are extremely poor activators or promoters for the reaction between acetylene and formic acid. They dehydrate formic acid producing carbon monoxide and water. Consequently, it is impractical to employ strong mineral acids as activators or promoters for the reaction between acetylene and formic acid. It could not then have been foreseen that a mercury catalyst in conjunction with a boric acid activator or promoter would possess such desirable improved catalytic properties that it will catalyze the reaction between even formic acid and acetylene, which reaction proceeds so poorly when catalyzed by either of the mercury-sulfuric acid or mercury-ortho phosphoric acid catalysts.

It has also been proposed in British Patent 459,882 to I. G. Farbenindustrie Aktiengesellschaft to react acetylene and certain aliphatic acids in the presence of a mercuric oxide-boric oxide and hydrofluoric acid composition or mercuric oxide-boric acid and hydrofluoric acid composition. Such a catalytic mixture doubtless results in the formation of boron trifluoride disclosed in United States Patent Number 1,912,608 to Walter Weibezahn dated June 6, 1933. The present invention as is readily apparent is in no way related to these processes. Furthermore, the use of hydrofluoric acid is accompanied by many disadvantages. It is exceptionally corrosive and this alone offers many operating difficulties.

An object of this invention is then to provide a new relatively cheap organic catalyst.

Another object of this invention is to provide a catalyst which is especially adaptable for the promotion of ester formation.

Another object of this invention is to provide a method for the formation of vinyl esters.

A further object of this invention is to provide a method for the formation of vinyl esters of strong aliphatic acids, such for example as formic and chloracetic acids.

Other and further objects of the invention will be hereinafter shown.

The following specific examples are understood to be embodiments of the invention showing specific uses of the new catalytic composition of the invention and in no sense limitative of the scope thereof, the parts being by weight.

To 100 parts of anhydrous formic acid placed in a suitable vessel equipped with cooling and agitating means, there is preferably added 0.2 to 0.4 part of mercuric acetate and 0.10 to 0.20 part of boric acid. Into this mixture so obtained, acetylene gas is added rapidly with agitation, maintaining the temperature at substantially 10°–20° C. The absorption of the acetylene and reaction with formic acid takes place rapidly. After substantially 38.8 parts of acetylene are added, requiring about one hour, the addition of acetylene is discontinued. In the process of the present invention it is found that the acetylene may be added as rapidly as cooling the solution will permit. Furthermore, it is found that on carrying out the process of the present invention little or no secondary reaction forming ethylidene diformate takes place. On the contrary the reaction product so formed consists substantially entirely of mono-vinyl formate. In many processes heretofore employed for the preparation of vinyl esters, for example vinyl acetate by reacting acetylene with acetic acid in the presence of a mercury catalyst and a promoting substance, the reaction proceeds slowly and the vinyl ester so formed must be removed by means of excess acetylene in order to avoid further reaction, with the accompanying formation of ethylidene diacetate.

On completion of the reaction sufficient sodium formate is added to deactivate the catalyst, and the monovinyl formate recovered in high yield, preferably by flash distillation, and separated from any unreacted formic acid. Other convenient methods of isolating the monovinyl formate may, if desirable, be employed. Thus, distillation under reduced pressure may be employed, if so desired. Yields of nearly theoretical based on the acetylene absorbed are obtained employing the new catalyst in the manner indicated.

If desirable, temperatures differing from the preferred temperature of 10°–20° C. may be employed for the reaction between acetylene and formic acid. Thus, I have employed temperatures as high as 40° C. for this reaction. When employing such higher temperatures, however, the reaction mixture was somewhat darker than where lower temperatures were employed and there was a slight lowering of the absorption of acetylene.

Furthermore, if desirable, the quantity of mercury catalyst and boric acid promoter may be increased over that given above.

The esterification process above disclosed may be carried out in the form of a continuous process. Thus, the reaction mixture is withdrawn from the reaction chamber at the desired optimum point of reaction, the catalyst deactivated and the monovinyl formate separated therefrom by flash distillation or other means. The formic acid in the still residue is recovered by hydrolysis, concentrated and together with the higher boiling fractions of the distillate, comprising unreacted formic acid, returned to the system. Fresh formic acid and catalyst are additionally added to complete the charge and the process continued by the addition of acetylene. When operating in this manner, preferably the full quantity of boric acid is employed, but considerably less of the mercury catalyst may be used since the recovered formic acid is more reactive towards acetylene. This highly reactive recovered formic acid causes a marked reduction in the induction period. Thus, when employing only 0.2 part by weight of mercuric acetate, the induction period for the reaction between acetylene and formic acid is reduced to zero.

As another specific example showing the use of the preferred new catalyst, chloracetic acids has been reacted with acetylene to produce the vinyl ester of chloracetic acid in a manner analogous to that employed above for the manufacture of monovinyl formate. Excellent results were obtained.

In the catalyst composition of the invention, of course, other ratios of the components may be employed than those specifically shown. Again other mercury catalysts than mercuric acetate may be employed with a boric acid activator, as will be well-known to those skilled in the art to which the invention pertains. As an example I may use mercuric oxide.

The present invention is limited solely by the following claims appended hereto as a part of this specification.

What is claimed is:

1. A process of preparing a vinyl ester of a lower fatty acid, which comprises reacting acetylene with said organic acid in the presence of a catalytic mercury compound and boric acid as an activating substance.

2. A process of preparing a vinyl ester of a readily active lower aliphatic acid which comprises reacting acetylene with said aliphatic acid in the presence of a catalytic mercury compound and boric acid as an activating substance.

3. A process for preparing a vinyl ester of a lower fatty acid of the class of formic and chloracetic acids which comprises reacting acetylene with said aliphatic acid in the presence of a catalyst consisting in a catalytic mercury compound and boric acid.

4. A process of preparing vinyl formate comprising reacting acetylene with formic acid in the presence of a catalyst consisting in a catalytic mercury compound and boric acid.

5. A process of preparing vinyl formate comprising reacting acetylene with formic acid, said reactants being in contact with mercuric acetate activated with boric acid.

6. A process of preparing mono vinyl formate comprising passing acetylene into formic acid in the presence of a catalyst consisting in a catalytic mercury compound and boric acid, deactivating said catalyst, recovering the mono vinyl formate and any unreacted formic acid returning the recovered formic acid to the reaction chamber, adding additional formic acid and said catalyst thereto and continuing the reaction of acetylene therewith.

GRAFTON R. OWENS.